(12) United States Patent
Morita et al.

(10) Patent No.: US 9,368,281 B2
(45) Date of Patent: Jun. 14, 2016

(54) LAMINATED CERAMIC ELECTRONIC COMPONENT

(75) Inventors: Koichiro Morita, Takasaki (JP); Atsushi Imai, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 272 days.

(21) Appl. No.: 13/817,409

(22) PCT Filed: Jun. 13, 2011

(86) PCT No.: PCT/JP2011/063460
§ 371 (c)(1),
(2), (4) Date: Mar. 1, 2013

(87) PCT Pub. No.: WO2012/023334
PCT Pub. Date: Feb. 23, 2012

(65) Prior Publication Data
US 2013/0208399 A1    Aug. 15, 2013

(30) Foreign Application Priority Data
Aug. 18, 2010  (JP) .................. 2010-183002

(51) Int. Cl.
*H01G 4/30*    (2006.01)
*H01G 4/06*    (2006.01)
*H01G 4/12*    (2006.01)

(52) U.S. Cl.
CPC ... *H01G 4/30* (2013.01); *H01G 4/12* (2013.01)

(58) Field of Classification Search
CPC ....... H01G 4/30; H01G 4/232; H01G 4/1227; H01G 4/2325; H01L 28/40
USPC .......... 361/321.1, 301.4, 321.2, 313
See application file for complete search history.

(56) References Cited

FOREIGN PATENT DOCUMENTS

| JP | 11340082 A | * | 12/1999 |
| JP | H11-340082 A | | 12/1999 |
| JP | 2003-309039 A1 | | 10/2003 |

OTHER PUBLICATIONS

An Office Action issued by the Korean Patent Office, mailed Apr. 21, 2014, for Korean counterpart application No. 10-2013-7003556.

* cited by examiner

*Primary Examiner* — Eric Thomas
*Assistant Examiner* — Arun Ramaswamy
(74) *Attorney, Agent, or Firm* — Law Office of Katsuhiro Arai

(57) ABSTRACT

In a laminated ceramic capacitor, a cylindrical ceramic part of its ceramics includes, in a manner not exposed to the surface of the ceramics, a cylinder-shaped high-void-ratio part which has a void ratio higher than the void ratio in the cylindrical ceramic part other than the high-void-ratio part and which has two layered parts facing the left and right sides of each layered conductor, respectively, as well as two layered parts facing the outer surfaces of the two outermost layered conductors, respectively. The laminated ceramic electronic component inhibits cracking of its sintered chip.

18 Claims, 4 Drawing Sheets

LAMINATED CERAMIC ELECTRONIC COMPONENT

This application is the U.S. National Phase under 35 U.S.C. §371 of International Application PCT/JP2011/063460, filed Jun. 13, 2011, which claims priority to Japanese Patent Application No. 2010-183002, filed Aug. 18, 2010. The International Application is to be published under PCT Article 21(2) in a language other than English.

TECHNICAL FIELD

The present invention relates to a laminated ceramic electronic component including a laminated ceramic capacitor.

RELATED ART

FIG. 1 shows an exterior view of a conventional laminated ceramic capacitor widely known as a laminated ceramic electronic component, FIG. 2 (Sa) shows a section of FIG. 1 cut along line Sa-Sa, and FIG. 2 (Sb) shows a section of FIG. 1 cut along line Sb-Sb. Note that L, W and H in FIG. 1 indicate length, width and height, respectively.

This laminated ceramic capacitor 10 has: a sintered chip 11 of roughly rectangular solid shape constituted by ceramics 11a and many (20 in the figure) layered conductors 11b arranged therein in a manner facing each other; and a pair of external terminals 12 provided on both longitudinal ends of the sintered chip 11. The ceramics 11a constituting the sintered chip 11 is divided into many (19 in the figure) layered ceramic parts 11a1 present between the layered conductors 11b, and cylindrical ceramic part 11a2 present in a manner surrounding the entire layered conductors 11b. Of the many layered conductors 11b constituting the sintered chip 11, odd-numbered layered conductors 11b from the top have their end electrically connected to one external terminal 12, while even-numbered layered conductors 11b from the top have their end electrically connected to the other external terminal 12.

The sintered chip 11 of the laminated ceramic capacitor 10 is normally produced by stacking in a specified order and pressure-bonding ceramic green sheets having unsintered layered conductors formed on them and ceramic green sheets having no unsintered layered conductors formed on them, thereby obtaining an unsintered chip, which is then put in a sintering oven to simultaneously sinter the unsintered layered conductors and ceramic green sheets. In this sintering step, unsintered layered conductors and ceramic green sheets expand and contract thermally in non-uniform manners, and consequently the produced sintered chip 11 often generates delamination and residual stress.

The laminated ceramic capacitor 10 is generally mounted on a circuit board, etc., by reflow soldering, so if the sintered chip 11 generates delamination and residual stress, the delamination and residual stress will be amplified due to the thermal impact received at the time of reflow soldering, potentially causing the sintered chip 11 to crack.

Such delamination and residual stress are often present at the interface BF1 (the reference numeral is not shown in the figures) between each layered ceramic part 11a1 and each layered conductor 11b, and at the interface BF2 (the reference numeral is not shown in the figures) between the cylindrical ceramic part 11a2 and either of the two outermost layered conductors 11b (top layered conductor 11b and bottom layered conductor 11b). Accordingly, if delamination and residual stress are amplified due to the thermal impact received at the time of reflow soldering and stress generates that cleaves the interfaces BF1 and BF2, the stress may be transmitted primarily to the left and right of the cylindrical ceramic part 11a2 (that is, parts facing the two sides of each layered conductor 11b) to generate cracks in these left and right parts. Cracks may generate not only at the time of reflow soldering, but also when the laminated ceramic capacitor 10 mounted on a circuit board, etc., is exposed to high temperature and receives thermal impact, or when the laminated ceramic capacitor 10 receives thermal impact due to self-generation of heat and resulting temperature rise.

Japanese Patent Laid-open No. 2003-309039 (Patent Literature 1) discloses a laminated ceramic capacitor 10' constituted in such a way that its sintered chip does not generate delamination or residual stress. The constitution of this laminated ceramic capacitor 10' is shown in FIGS. 3 (A) and 3 (B). As shown in the figures, the laminated ceramic capacitor 10' has a constitution roughly similar to that of the laminated ceramic capacitor 10. With the laminated ceramic capacitor 10', the abundance ratio of pores 11c in the top and bottom parts of the cylindrical ceramic part 11a2 of the ceramics 11a constituting the sintered chip 11 increases toward the interior of the cylindrical ceramic part 11a compared to its top and bottom surfaces. The pores 11c are formed as the binder contained in the ceramic green sheet disappears in the sintering step. By constituting the top and bottom parts of the cylindrical ceramic part 11a2 using multiple ceramic green sheets and increasing the binder content in these multiple ceramic green sheets toward the interior compared to the top and bottom surfaces, the abundance ratio of pores 11c increases toward the interior. The abundance ratio of pores 11c in the left and right parts of the cylindrical ceramic part 11a2 is the same as the pore abundance ratio in the layered ceramic part 11a1.

Since this laminated ceramic capacitor 10' is constituted in such a way that the abundance ratio of pores 11c in the top and bottom parts of the cylindrical ceramic part 11a2 of the ceramics 11a constituting the sintered chip 11 increases toward the interior compared to the top and bottom surfaces, any potential transmission of stress to the top and bottom parts of the cylindrical ceramic part 11a2 from the interface BF2 as a result of amplification of delamination and residual stress caused by reflow soldering, etc., is suppressed to some extent by a cluster of pores 11c, primarily those adjacent to the two outermost layered conductors 11b.

With the laminated ceramic capacitor 10', however, the abundance ratio of pores 11c in the left and right parts of the cylindrical ceramic part 11a2 is the same as the pore abundance ratio in the layered ceramic part 11a1, and therefore if the delamination and residual stress are amplified due to the thermal impact received at the time of reflow soldering, etc., and stress generates that cleaves the interfaces BF1 and BF2, then the stress will be directly transmitted to the left and right parts of the cylindrical ceramic part 11a2.

In essence, with the laminated ceramic capacitor 10', if stress generates that cleaves the interfaces BF1 and BF2 as a result of amplification of the delamination and residual stress due to the thermal impact received at the time of reflow soldering, etc., the stress will be transmitted primarily to the left and right parts of the cylindrical ceramic part 11a2 and cracks may generate in the left and right parts, just like with the laminated ceramic capacitor 10.

3

RELATED ART LITERATURE

Patent Literature

Patent Literature 1: Japanese Patent Laid-open No. 2003-309039

SUMMARY OF THE INVENTION

Problems to Be Solved by the Invention

The object of an embodiment of the present invention is to provide a laminated ceramic capacitor where generation of cracks in its sintered chip due to the thermal impact received at the time of reflow soldering, etc., is reliably prevented even when the sintered chip generates delamination and residual stress.

Means for Solving the Problems

To achieve the aforementioned object, a laminated ceramic electronic component pertaining to an embodiment of the present invention has a sintered chip of roughly rectangular solid shape constituted by ceramics and many layered conductors arranged therein in a manner facing each other, with the ceramics constituting the sintered chip divided into many layered ceramic parts present between the layered conductors and cylindrical ceramic part present in a manner surrounding the entire layered conductors; wherein the cylindrical ceramic part of the ceramics includes, in a manner not exposed to the surface of the cylindrical ceramic part, a high-void-ratio part which has a void ratio higher than the void ratio in the cylindrical ceramic part and which also has at least two layered parts, each part facing each side of each layered conductor.

If the sintered chip of the laminated ceramic electronic component generates delamination and residual stress, the delamination and residual stress may be amplified due to the thermal impact received at the time of reflow soldering, etc., and stress may generate that cleaves the interface between each layered ceramic part and each layered conductor as well as the interface between the cylindrical ceramic part and either of the two outermost layered conductors, in which case the stress may be transmitted to the "parts" of the cylindrical ceramics "facing each side of each layered conductor" and cracks may generate in these parts.

However, the cylindrical ceramic part of the laminated ceramic electronic component includes, in a manner not exposed to the surface of the cylindrical ceramic part, a high-void-ratio part which has a void ratio higher than the void ratio in the cylindrical ceramic part and which also has at least two layered parts each facing each side of each layered conductor, and therefore even if the delamination and residual stress are amplified due to the thermal impact received at the time of reflow soldering, etc., and stress generates that cleaves each interface, transmission of the stress to the "parts" of the cylindrical ceramics "facing each side of each layered conductor" can be effectively suppressed based on the stress diffusing action and stress buffering action due to the "two layered high-void-ratio parts" each facing each side of each layered conductor.

Effects of the Invention

According to an embodiment of the present invention, generation of cracks in the sintered chip due to the thermal impact received at the time of reflow soldering, etc., is reliably prevented even when the sintered chip generates delamination and residual stress.

The object, constitution, characteristics and actions/effects of the present invention are made clear from the detailed explanations below and drawings attached hereto.

MODE FOR CARRYING OUT THE INVENTION

Figure 1:
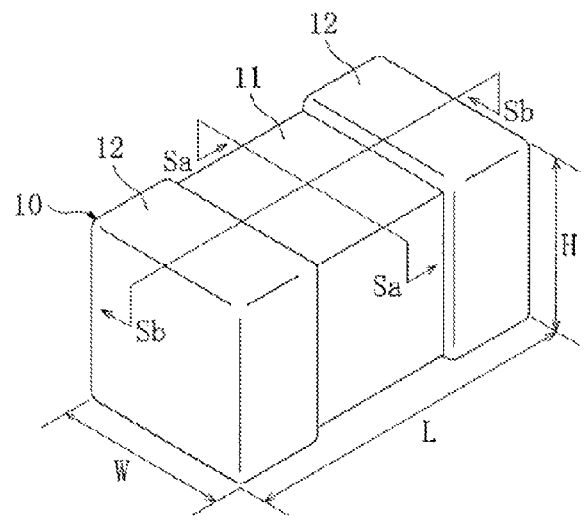
FIG. 1 is an exterior view of a conventional laminated ceramic capacitor.
Figure 2:
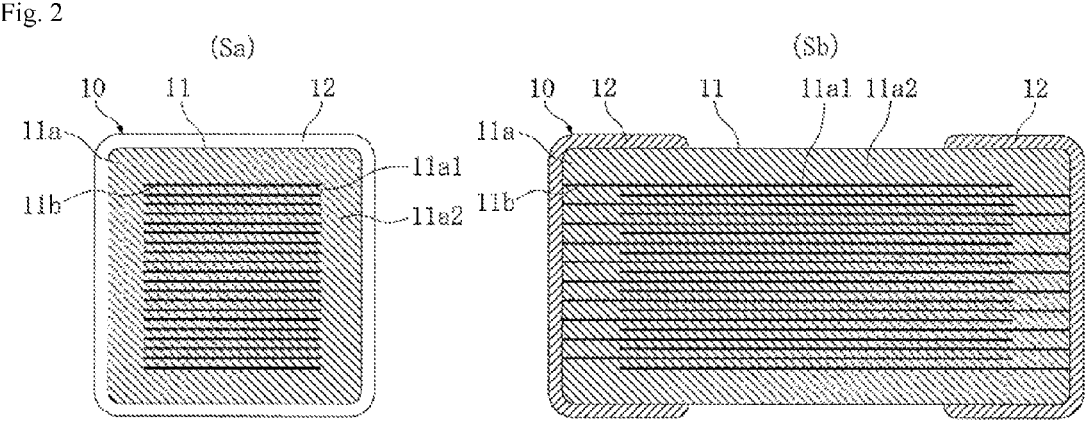
FIG. 2 (Sa) is a section view of FIG. 1 cut along line Sa-Sa, while FIG. 2 (Sb) is a section view of FIG. 1 cut along line Sb-Sb.
Figure 3:
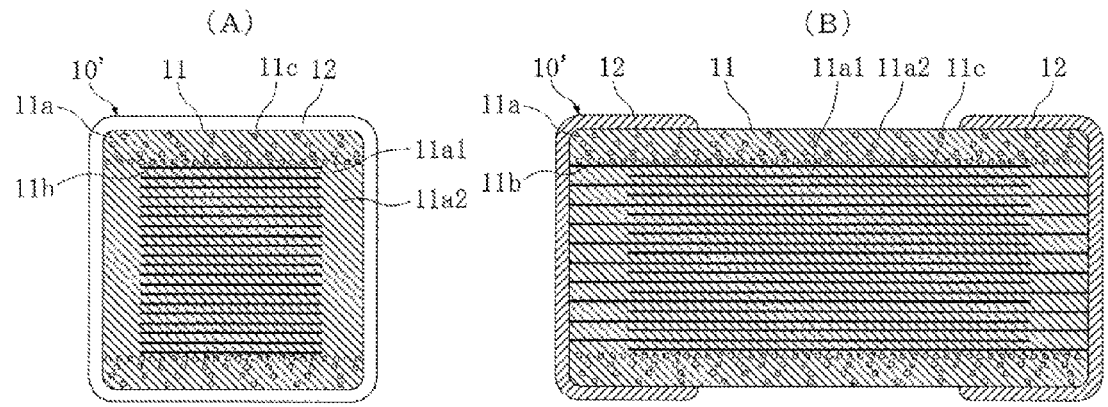
FIGS. 3 (A) and 3 (B) relate to a laminated ceramic capacitor pertaining to the invention described in Patent Literature 1, where FIG. 3 (A) is a section view corresponding to FIG. 2 (Sa), while FIG. 3 (B) is a section view corresponding to FIG. 2 (Sb).
Figure 4:
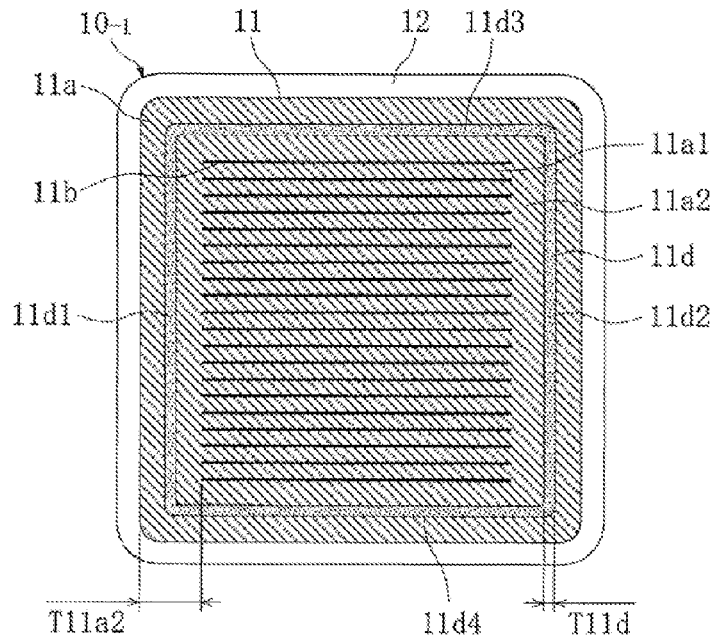
FIG. 4 is a section view of a laminated ceramic capacitor pertaining to the present invention (first embodiment), corresponding to FIG. 2 (Sa).
Figure 5:
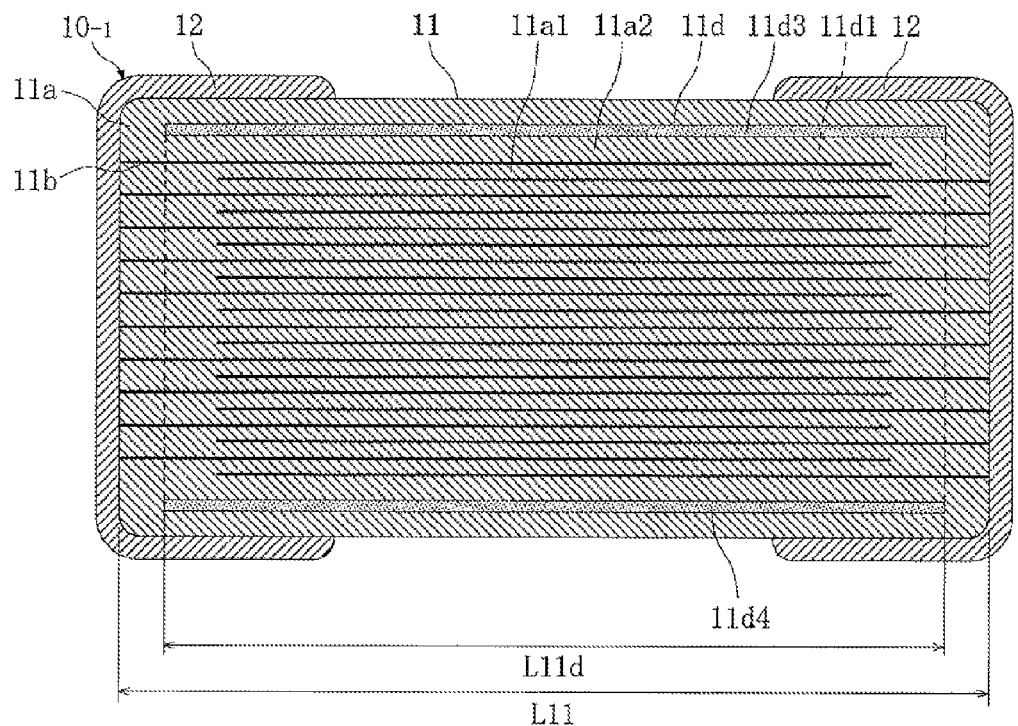
FIG. 5 is a section view of a laminated ceramic capacitor pertaining to the present invention (first embodiment), corresponding to FIG. 2 (Sb).

FIGS. 4 and 5 show a laminated ceramic capacitor pertaining to an embodiment of the present invention. FIG. 4 is a section view corresponding to FIG. 2 (Sa), while FIG. 5 is a section view corresponding to FIG. 2 (Sb). Of the components shown in FIGS. 4 and 5, those similar to the corresponding components shown in FIGS. 1, 2 (Sa) and 2 (Sb) are explained using the same reference numerals used in FIGS. 1, 2 (Sa) and 2 (Sb).

This laminated ceramic capacitor 10-1 has a sintered chip 11 of roughly rectangular solid shape, and a pair of external terminals 12 provided on both longitudinal ends of the sintered chip 11. The sintered chip 11 has ceramics 11a and many (20 in the figure) layered conductors 11b arranged therein in a manner facing each other. The ceramics 11a is divided into many (19 in the figure) layered ceramic parts 11a1 present between the layered conductors 11b, and cylindrical ceramic part 11a2 present in a manner surrounding the entire layered conductors 11b. Of the many layered conductors 11b, odd-numbered layered conductors 11b from the top have their ends electrically connected to one external terminal 12, while even-numbered layered conductors 11b from the top have their ends electrically connected to the other external terminal 12.

The top and bottom parts and left and right parts of the cylindrical ceramic part 11a2 of the ceramics 11a have roughly a uniform thickness T11a2. In this Specification, the "top and bottom parts" of the cylindrical ceramic part 11a2 refer to the parts facing the outer surfaces of the two outermost layered conductors 11b (top layered conductor 11b and bottom layered conductor 11b), while the "left and right parts" of the cylindrical ceramic part 11a2 refer to the parts facing the left and right sides of each layered conductor 11b. This cylindrical ceramic part 11a2 has a cylinder-shaped high-void-ratio part 11d integrally having layered parts 11d1, 11d2, 11d3, 11d4. The layered parts 11d1 and 11d2 have a void ratio higher than the void ratio in the cylindrical ceramic part 11a2 and also face the left and right sides of each layered conductor 11b. The layered parts 11d3 and 11d4 face the outer surfaces of the two outermost layered conductors 11b (top layered conductor 11b and bottom layered conductor 11b).

The four layered parts 11d1 to 11d4 have a roughly uniform thickness T11d and roughly uniform length L11d, where the thickness T11d is smaller than the thickness T11a2 of the cylindrical ceramic part 11a2, while the length L11d is smaller than the length L11 of the sintered chip 11 (cylindrical ceramic part 11a2). Since the layered parts 11d1 to 11d4 are positioned roughly at the center, in the thickness direction, of the left and right parts and top and bottom parts of the cylindrical ceramic part 11a2, the high-void-ratio part 11d is not exposed to the surface of the ceramics 11a and does not contact any layered conductor 11b.

In an embodiment, the void ratios in the four layered parts 11d1 to 11d4 are 2 to 20%, for example, but they are not at all limited to the foregoing. Additionally, the void ratio in the cylindrical ceramic part 11a2 excluding the high-void-ratio part 11d is lower than the void ratio in the high-void-ratio part 11d, such as less than 2%, for example, but it is not at all limited to the foregoing. Furthermore, the high-void-ratio part 11d is where pores are distributed unevenly. The pore diameter is roughly 0.1 to 3.0 μm, for example, but it is not at all limited to the foregoing.

In an embodiment of the present invention, the thickness of the cylindrical ceramic part 11a2 (T11a2) may be non-uniform, thickness of the layered parts 11d1 to 11d4 (T11d) may be non-uniform, and positions of the layered parts 11d1 to 11d4 may be slightly deviated from the center of the thickness of the cylindrical ceramic part 11a2 (T11a2).

Also, in an embodiment of the present invention, the length of the layered parts 11d1 to 11d4 (L11d) may be non-uniform, and length of the layered parts 11d1 to 11d4 (L11d) may be roughly the same as the length L11 of the sintered chip 11.

Figure 6:
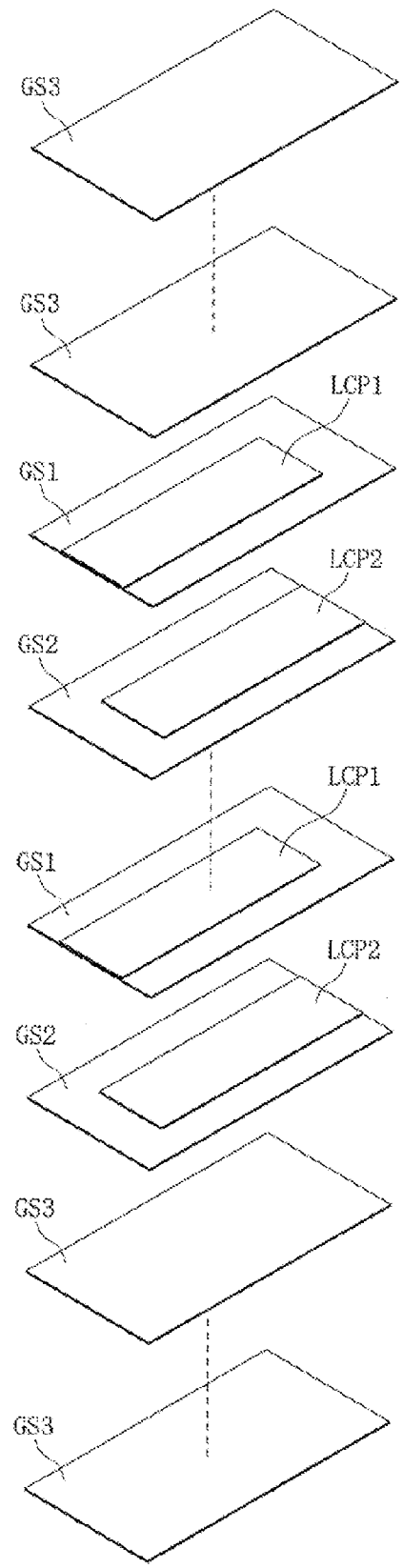
FIG. 6 is a drawing explaining how the laminated ceramic capacitor shown in FIGS. 4 and 5 (first embodiment) is manufactured.

Next, an example of how the laminated ceramic capacitor 10-1 is manufactured is explained by referring to FIG. 6.

First, a first ceramic green sheet GS1 having an unsintered layered conductor LCP1 formed on it, a second ceramic green sheet GS2 having an unsintered layered conductor LCP2 formed on it in a direction 180 degrees from the layered conductor LCP1, and a third ceramic green sheet GS3 having no layered conductor formed on it, are prepared.

The ceramic green sheets used for the first through third ceramic green sheets GS1 to GS3 are the same, each produced by coating a prepared ceramic slurry to a specified thickness using the die-coater method, doctor blade method, etc., and then drying the coated slurry. The unsintered layered conductors LCP1 and LCP2 are each produced by printing a prepared conductor paste onto the ceramic green sheet by means of screen printing, gravure printing or other printing method, and then drying the printed paste.

In an embodiment of the present invention, the ceramic slurry is obtained by mixing a dielectric ceramic powder, solvent, binder and additives. In an embodiment of the present invention, a dielectric ceramic powder whose main constituent is $BaTiO_3$ and which also contains Mg and Mn by a total amount of less than 0.20 percent by mol as calculated according to the element ratios can be used. For example, a dielectric ceramic powder can be used that blends $BaTiO_3$, MgO, $Mn_3O_4$, $Ho_2O_3$ and $SiO_2$ at the element ratios of 48.92 percent by mol for Ba, 48.92 percent by mol for Ti, 0.08 percent by mol for Mg, 00.8 percent by mol for Mn, 1.00 percent by mol for Ho, and 1.00 percent by mol for Si. The conductor paste can be obtained by mixing a metal powder, solvent, binder and additives, where a Ni powder can be used for the metal powder, for example.

Next, the first through third ceramic green sheets GS1 to GS3 are layered in the order shown in FIG. 6 and pressure-bonded to obtain an unsintered chip. To obtain a laminated ceramic capacitor 10-1 (having 20 layered conductors 11b) of 1608 in size (representing a reference length dimension of 1.6 mm and reference width and height dimension of 0.8 mm), the first through third ceramic green sheets GS1 to GS3 should be approx. 1.6 mm long and approx. 0.8 mm wide, and the first and second ceramic green sheets GS1 and GS2 are prepared by 10 pieces each. Also, to make roughly uniform the thicknesses of the top and bottom parts and left and right parts of the cylindrical part (corresponding to the cylindrical ceramic part 11a2 of the sintered chip 11) present in a manner surrounding the entire unsintered layered conductors LCP1 and LCP2 on the unsintered chip, a margin of approx. 0.2 mm in width, for example, is left on the left and right of the unsintered layered conductors LCP1 and LCP2 formed on the first and second ceramic green sheets GS1 and GS2. Additionally, to make roughly the same as the dimension of this margin the thicknesses of the top and bottom parts of the cylindrical part present in a manner surrounding the entire unsintered layered conductors LCP1 and LCP2, the number of third ceramic green sheets GS3 used to constitute both parts is adjusted accordingly.

In an embodiment of the present invention, an unsintered chip may be obtained by preparing large-sized first through third ceramic green sheets, each having multiple layered conductors LCP1 and LCP2 formed on it, and then dicing the pressure-bonded laminate thereof into chip sizes.

Next, the unsintered chip obtained as above is put in a sintering oven and the unsintered layered conductors LCP1 and LCP2 and ceramic green sheets (GS1 to GS3) are simultaneously sintered in a reducing ambience, to obtain a sintered chip 11. This sintering step may comprise 2 hours of sintering at approx. 1200° C. by setting a rate of temperature rise higher than the conventional rate of temperature rise (normally 100 to 500° C./h), such as 2000 to 3000° C./h. In this case, the quicker temperature rise than the conventional rate in the sintering step causes sintering to progress from the interior of the unsintered chip, just as sintering progresses at the surface of the unsintered chip, due to the heat conduction from the layered conductors LCP1 and LCP2 that are yet to be sintered or being sintered, and consequently heat is applied non-uniformly to the interior of the unsintered chip. As a result, the speed of sintering progress varies at different locations in the unsintered chip and therefore a sintered structure having the aforementioned cylinder-shaped high-void-ratio part 11d can be obtained.

In an embodiment of the present invention, the ceramics 11a is made by using a dielectric ceramic powder containing Mg and Mn by a specified total amount, such as less than 0.20 percent by mol. This limits the grain-growth suppressing action of Mg and Mn, and therefore pores concentrate in a layered pattern roughly at the center of the thickness T11a2 in the top, bottom, left and right parts of the cylindrical ceramic part 11a2 of the ceramics 11a, and the high-void-ratio part 11d shown in FIGS. 4 and 5 is formed, as a result. In this case, oxides of Ba, Mg, Ho and Si contained in the ceramic green sheets (GS1 to GS3) constituting the unsintered chip are segregated in the high-void-ratio part 11d.

When the high-void-ratio part 11d (layered parts 11d1 to 11d4) of the sintered chip 11 of 1608 in size that had been produced through the aforementioned sintering step was observed by an electron microscope, a high-void-ratio part 11d (layered parts 11d1 to 11d4) having a thickness T11d of 30 μm had been formed roughly at the center, in the thickness direction, of the cylindrical ceramic part 11a2 formed to a thickness of approx. 0.2 mm in its top and bottom parts and left and right parts. Also, the high-void-ratio part 11d (layered parts 11d1 to 11d4) had pores of approx. 0.1 to 3.0 μm in diameter evenly concentrated and there were virtually no pores other than in the high-void-ratio part 11d. Furthermore, the void ratio in the high-void-ratio part 11d (layered parts 11d1 to 11d4) was in a range of 2 to 20% and the void ratio in the cylindrical ceramic part 11a2 other than the high-void-ratio part 11d was less than 2%.

Next, a terminal paste equivalent to the aforementioned conductor paste is applied to both longitudinal ends of the sintered chip 11, to a specified thickness, using the dipping method or other application method, after which the coated chip is sintered by baking to produce a pair of external terminals 12. In an embodiment, the external terminals 12 can be produced by forming, on the sintered film, other type of metal film using electroplating or other plating method.

Generally the laminated ceramic capacitor 10-1 is mounted on a circuit board, etc., by means of reflow soldering. This means that, if the sintered chip 11 generates delamination and residual stress, the delamination and residual stress may be amplified due to the thermal impact received at the time of reflow soldering and cracks may generate in the sintered chip 11 as a result. Since this stress is primarily transmitted to the left and right parts of the cylindrical ceramics 11a2, as mentioned above, the crack-generating stress tends to concentrate in these left and right parts.

With the sintered chip 11 of the laminated ceramic capacitor 10-1 pertaining to an embodiment of the present invention, since the cylindrical ceramic part 11a2 includes the cylinder-shaped high-void-ratio part 11d, stress that may generate to cleave the interfaces BF1 and BF2 as a result of amplification of the delamination and residual stress due to the thermal impact received at the time of reflow soldering, etc., is prevented from being transmitted to the left and right parts of the cylindrical ceramic part 11a2 due to the "two layered high-void-ratio parts 11d1 and 11d2" facing the left and right sides of each layered conductor 11b. The cluster of pores present in the layered parts 11d1 and 11d2 has stress diffusing action and stress buffering action. As a result, the stress transmitted to the layered parts 11d1 and 11d2 is diffused by the cluster of pores included in the layered parts 11d1 and 11d2 and prevented from being transmitted to the left and right parts of the cylindrical ceramic part 11a2. Similarly, transmission of stress to the top and bottom parts of the cylindrical ceramic part 11a2 from the interface BF2 is suppressed by the "two layered high-void-ratio parts 11d3 and 11d4."

As explained above, generation of cracks in the sintered chip 11 due to the thermal impact received at the time of reflow soldering, etc., is reliably prevented in an embodiment of the present invention, even when the sintered chip 11 generates delamination and residual stress.

Additionally, the high-void-ratio part 11d is formed in a manner not exposed to the surface of the ceramics 11a. This prevents water from entering from the outside through the pores in the high-void-ratio part 11d and causing the characteristics of the laminated ceramic capacitor 10-1 to deteriorate. This explains how the laminated ceramic capacitor 10-1 pertaining to an embodiment of the present invention offers not only excellent humidity resistance characteristics before and after mounting, but also excellent thermo-cycle resistance characteristics.

Also, in an embodiment of the present invention, the two layered parts 11d1 and 11d2 are formed in a manner not contacting any layered conductor 11b. This prevents generation of cracks that would be otherwise caused by contact between the left and right sides of each layered conductor 11b and the layered parts 11d1 and 11d2 of the high-void-ratio part 11d.

Also, in an embodiment of the present invention, the void ratio in the high-void-ratio part 11d is in a range of 2 to 20%, and the void ratio in parts of the cylindrical ceramic part 11a2 other than the high-void-ratio part 11d is less than 2%. Accordingly, parts of the cylindrical ceramic part 11a2 other than the high-void-ratio part 11d are resistant to rigidity deterioration due to the cluster of pores generated. Since these parts of the cylindrical ceramic part 11a2 other than the high-void-ratio part 11d surround the high-void-ratio part 11d, cracking of the high-void-ratio part 11d due to thermal impact, application of external force, etc., can be prevented.

Also, in an embodiment of the present invention, oxides of Ba, Mg, Ho and Si are segregated in the high-void-ratio part 11d, and therefore these oxides enhance the rigidity of the high-void-ratio part 11d and consequently cracking of the high-void-ratio part 11d due to thermal impact, application of external force, etc., can be avoided more effectively.

Figure 7:
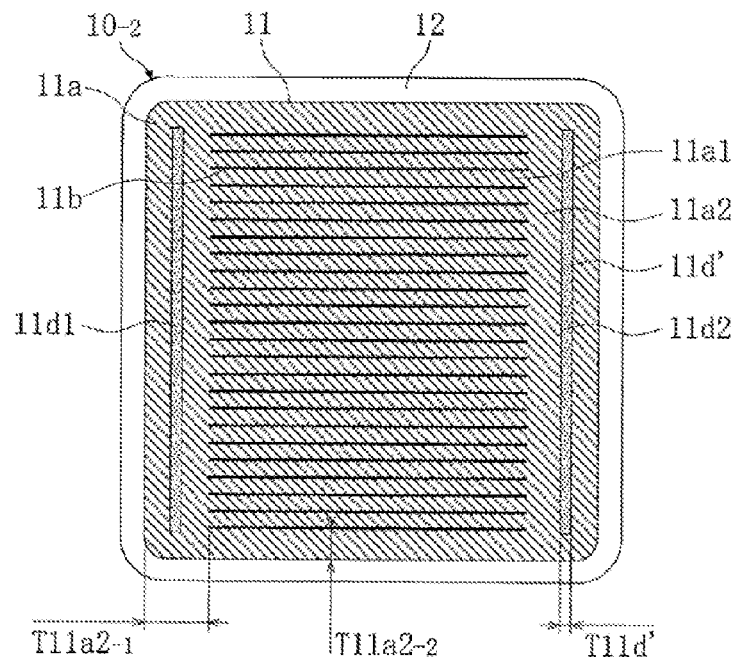
FIG. 7 is a section view of a laminated ceramic capacitor pertaining to the present invention (second embodiment), corresponding to FIG. 2 (Sa).
Figure 8:
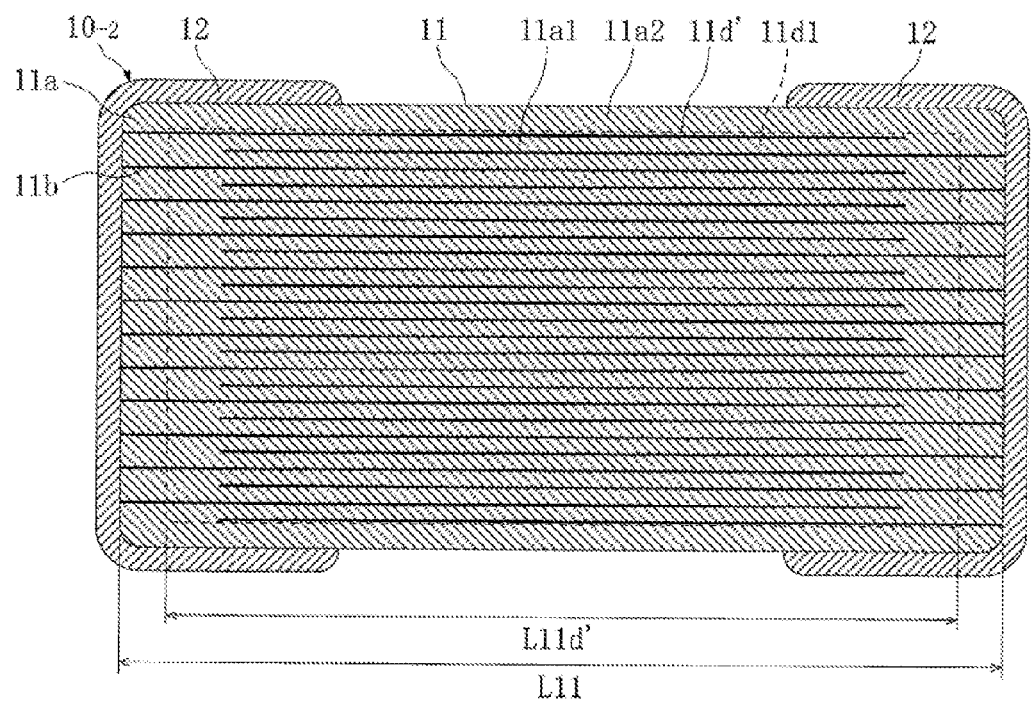
FIG. 8 is a section view of a laminated ceramic capacitor pertaining to the present invention (second embodiment), corresponding to FIG. 2 (Sb).

Another embodiment of the present invention is explained by referring to FIGS. 7 and 8. FIGS. 7 and 8 indicate a laminated ceramic capacitor pertaining to another embodiment of the present invention. FIG. 7 is a section view corresponding to FIG. 2 (Sa), while FIG. 8 is a section view corresponding to FIG. 2 (Sb). Of the components shown in FIGS. 7 and 8, those similar to the corresponding components shown in FIGS. 1, 2 (Sa) and 2 (Sb) are explained using the same reference numerals used in FIGS. 1, 2 (Sa) and 2 (Sb).

The laminated ceramic capacitor 10-2 pertaining to another embodiment of the present invention is different from the laminated ceramic capacitor 10-1 in the points explained below. To be specific, the laminated ceramic capacitor 10-2 includes 24 layered conductors 11b, while its cylindrical ceramic part 11a2 is formed in such a way that the thickness T11a2-1 of its left and right parts becomes greater than the thickness T11a2-2 of its top and bottom parts. Also with the laminated ceramic capacitor 10-2, the high-void-ratio part 11d' is constituted by two layered parts 11d1 and 11d2 facing the left and right sides of each layered conductor 11b.

The left and right parts of the cylindrical ceramic part 11a2 have a roughly uniform thickness T11a2-1, while the top and bottom parts also have a roughly uniform thickness T11a2-2. The thickness T11a2-2 of the top and bottom parts is smaller than the thickness T11a2-1 of the left and right parts. This cylindrical ceramic part 11a2 includes a high-void-ratio part 11d' which has a void ratio higher than the void ratio in the cylindrical ceramic part 11a2 and which also has the two layered parts 11d1 and 11d2 facing the left and right sides of each layered conductor 11b.

The two layered parts 11d1 and 11d2 are formed in a manner having roughly a uniform thickness T11d' and both have an equal length L11d'. The thickness T11d' is smaller than the thickness T11a2-1 of the left and right parts of the cylindrical ceramic part 11a2, while the length L11d' is smaller than the length L11 of the sintered chip 11 (cylindrical ceramic part 11a2). The layered parts 11d1 and 11d2 are formed roughly at the center of the thickness T11a2-1 in the left and right parts of the cylindrical ceramic part 11a2 so that the high-void-ratio part 11d' will not be exposed to the surface of the ceramics 11a and so that no layered conductor 11b will be contacted.

In an embodiment of the present invention, the void ratio in the two layered parts 11d1 and 11d2 constituting the high-void-ratio part 11d' is in a range of 2 to 20%, for example. In addition, the void ratio in the cylindrical ceramic part 11a2 other than the high-void-ratio part 11d' is lower than the void ratio in the high-void-ratio part 11d', such as less than 2%, for example. Furthermore, the high-void-ratio part 11d' is where pores are unevenly distributed and the diameters of the pores are in a range of approx. 0.1 to 3.0 μm.

In an embodiment of the present invention, the thickness of the left and right parts of the cylindrical ceramic part 11a2 (T11a2-1) may be non-uniform, thickness of the layered parts 11d1 and 11d2 (T11d') may be non-uniform, and positions of the layered parts 11d1 and 11d2 may slightly deviate from the center of the thickness (T11a2-1) of the left and right parts of the cylindrical ceramic part 11a2.

In an embodiment of the present invention, the length of the layered parts 11d1 and 11d2 (L11d') may be non-uniform, and length of the layered parts 11d1 and 11d2 (L11d') may be roughly the same as the length L11 of the sintered chip 11.

Here, an example of how the laminated ceramic capacitor 10-2 shown in FIGS. 7 and 8 is manufactured is explained by again referring to FIG. 6. In the manufacturing method of laminated ceramic capacitor 10-2, explanation of the same steps included in the manufacturing method of laminated ceramic capacitor 10-1 is skipped as deemed appropriate.

First, as in the manufacturing method of laminated ceramic capacitor 10-1, first through third ceramic green sheets GS1 to GS3 are prepared. Next, the first through third ceramic green sheets GS1 to GS3 are layered in the order shown in FIG. 6 and pressure-bonded to obtain an unsintered chip. To obtain a laminated ceramic capacitor 10-2 (having 24 layered conductors 11b), per FIGS. 7 and 8, of 1608 in size, the first through third ceramic green sheets GS1 to GS3 should be approx. 1.6 mm long and approx. 0.8 mm wide, and the first and second ceramic green sheets GS1 and GS2 are used by 12 pieces each. Also, to make roughly uniform the thicknesses of the left and right parts of the cylindrical part (corresponding to the cylindrical ceramic part 11a2 of the sintered chip 11 shown in FIGS. 7 and 8) present in a manner surrounding the entire unsintered layered conductors LCP1 and LCP2 on the unsintered chip, a margin of approx. 0.2 mm in width, for example, is left on the left and right of the unsintered layered conductors LCP1 and LCP2 formed on the first and second ceramic green sheets GS1 and GS2. Additionally, to make smaller than this margin the thickness of the top and bottom parts of the cylindrical part present in a manner surrounding the entire unsintered layered conductors LCP1 and LCP2, the number of third ceramic green sheets GS3 used to constitute the both parts is adjusted to approx. 0.1 mm, for example.

Next, the unsintered chip obtained as above is put in a sintering oven and the unsintered layered conductors LCP1 and LCP2 and ceramic green sheets (GS1 to GS3) are simultaneously sintered in a reducing ambience for 2 hours at approx. 1200° C. by setting a rate of temperature rise to 2000 to 3000° C./h, for example, to obtain a sintered chip 11.

As described above, in an embodiment of the present invention the ceramics 11a is made by using a dielectric ceramic powder containing Mg and Mn by a specified total amount, such as less than 0.20 percent by mol. This limits the grain-growth suppressing action of Mg and Mn, and therefore pores generate easily in the cylindrical ceramic part 11a2. In an embodiment of the present invention, the thickness of the top and bottom parts of the cylindrical part (corresponding to the cylindrical ceramic part 11a2 of the sintered chip 11 shown in FIGS. 7 and 8) present in a manner surrounding the entire unsintered layered conductors LCP1 and LCP2 is adjusted to a specified thickness, such as 80 μm, for example, so that pores will concentrate in a layered pattern roughly at the center of the thickness T11a2-1 in the left and right parts, without generating any clear pore layer in the top and bottom parts. As a result, the high-void-ratio part 11d' shown in FIGS. 7 and 8 is formed. In this case, oxides of Ba, Mg, Ho and Si contained in the ceramic green sheets (GS1 to GS3) constituting the unsintered chip are segregated in the high-void-ratio part 11d'.

When the high-void-ratio part 11d' (layered parts 11d1 and 11d2) of the sintered chip 11 of 1608 in size that had been produced through the aforementioned sintering step was observed by an electron microscope, a high-void-ratio part 11d' (layered parts 11d1 and 11d2) having a thickness T11d' of 30 μm had been formed roughly at the center, in the thickness direction, of the left and right parts of the cylindrical ceramic part 11a2 formed to a thickness of approx. 0.2 mm in its left and right parts, and no high-void-ratio part 11d' had been formed in the top and bottom parts of the cylindrical ceramic part 11a2. Also, the high-void-ratio part 11d' (layered parts 11d1 and 11d2) had pores of approx. 0.1 to 3.0 μm in diameter evenly concentrated and there were virtually no pores other than in the high-void-ratio part 11d'. Furthermore, the void ratio in the high-void-ratio part 11d' (layered parts 11d1 and 11d2) was in a range of 2 to 20% and the void ratio in the cylindrical ceramic part 11a2 other than the high-void-ratio part 11d' was less than 2%.

Next, a pair of external terminals 12 is produced on both longitudinal ends of the sintered chip 11. The method for forming the external terminals 12 is the same as with the laminated ceramic capacitor 10-1.

With the sintered chip 11 of the laminated ceramic capacitor 10-2 pertaining to another embodiment of the present invention, since there is a high-void-ratio part 11d' in the left and right parts of the cylindrical ceramic part 11a2 of the ceramics 11a constituting the sintered chip 11, stress that may generate to cleave the interfaces BF1 and BF2 as a result of amplification of the delamination and residual stress due to the thermal impact received at the time of reflow soldering, etc., is prevented from being transmitted to the left and right parts of the cylindrical ceramic part 11a2 due to the "two layered high-void-ratio parts 11d1 and 11d2."

As explained above, generation of cracks in the sintered chip 11 due to the thermal impact received at the time of reflow soldering, etc., is also reliably prevented in this embodiment of the present invention, even when the sintered chip 11 generates delamination and residual stress. Also because the high-void-ratio part 11d' is not exposed to the surface of the ceramics 11a, deterioration of characteristics caused by entry of water from the outside is prevented, as is the case with the laminated ceramic capacitor 10-1. Also because the two layered parts 11d1 and 11d2 do not contact any layered conductor 11b, generation of cracks due to contact is prevented, which is again the same as with the laminated ceramic capacitor 10-1.

Furthermore, the void ratio in the high-void-ratio part 11d' is in a range of 2 to 20%, and the void ratio in parts of the cylindrical ceramic part 11a2 other than the high-void-ratio part 11d' is less than 2%. Accordingly, parts of the cylindrical ceramic part 11a2 other than the high-void-ratio part 11d' are resistant to rigidity deterioration due to the cluster of pores generated. Since these parts of the cylindrical ceramic part 11a2 other than the high-void-ratio part 11d' surround the high-void-ratio part 11d', cracking of the high-void-ratio part 11d' due to thermal impact, application of external force, etc., is prevented.

Also, in an embodiment of the present invention, segregation of oxides of Ba, Mg, Ho and Si in the high-void-ratio part 11d' enhances the rigidity of the high-void-ratio part 11d' due to these oxides, which is again the same as with the laminated ceramic capacitor 10-1.

Embodiments of the present invention are not at all limited to the embodiments expressly described above, and various changes can be added to the specific embodiments described in this Specification. For example, the number of layered conductors 11b can be changed in any way as required. Also, the present invention can be applied to any electronic component other than a laminated ceramic capacitor, such as a piezoelectric element, coil element, etc.

DESCRIPTION OF THE SYMBOLS 10-1, 10-2—Laminated ceramic capacitor, 11—Sintered chip, 11a—Ceramics, 11a1—Layered ceramic part of ceramics, 11a2—Cylindrical ceramic part of ceramics, 11b—Layered conductor, 11d, 11d'—High-void-ratio part, 11d1, 11d2, 11d3, 11d4—Layered part of high-void-ratio part.

What is claimed is:

1. A laminated ceramic electronic component having a sintered chip of roughly rectangular solid shape constituted by ceramics and many layered conductors arranged therein in a manner facing each other, with the ceramics constituting the sintered chip divided into many layered ceramic parts present between the layered conductors and a cylindrical ceramic part present in a manner surrounding the entire layered conductors;

wherein the cylindrical ceramic part of the ceramics includes, in a manner not exposed to a surface of the cylindrical ceramic part nor contacting the layered conductors, a high-void-ratio part which has a void ratio higher than a void ratio at any part of the cylindrical ceramic part other than the high-void-ratio part and which also has at least two layer-parts facing each other and extending in a direction parallel to a lamination direction of the layered conductors along sides of the layered conductors, in which high-void-ratio part pores are randomly distributed.

2. A laminated ceramic electronic component according to claim 1, wherein the high-void-ratio part also integrally has two layered parts facing outer surfaces of two outermost layered conductors, respectively, in addition to the two layered parts each facing one side of each layered conductor.

3. A laminated ceramic electronic component according to claim 1, wherein the two layered parts in the high-void-ratio part, which are each facing one side of each layered conductor, do not contact any layered conductor.

4. A laminated ceramic electronic component according to claim 1, wherein a void ratio in the high-void-ratio part is in a range of 2 to 20%, and a void ratio in the cylindrical ceramic part other than the high-void-ratio part is less than 2%.

5. A laminated ceramic electronic component according to claim 1, wherein said laminated ceramic electronic component is a laminated ceramic capacitor.

6. A laminated ceramic electronic component according to claim 2, wherein the two layered parts in the high-void-ratio part, which are each facing one side of each layered conductor, do not contact any layered conductor.

7. A laminated ceramic electronic component according to claim 2, wherein a void ratio in the high-void-ratio part is in a range of 2 to 20%, and a void ratio in the cylindrical ceramic part other than the high-void-ratio part is less than 2%.

8. A laminated ceramic electronic component according to claim 3, wherein a void ratio in the high-void-ratio part is in a range of 2 to 20%, and a void ratio in the cylindrical ceramic part other than the high-void-ratio part is less than 2%.

9. A laminated ceramic electronic component according to claim 6, wherein a void ratio in the high-void-ratio part is in a range of 2 to 20%, and a void ratio in the cylindrical ceramic part other than the high-void-ratio part is less than 2%.

10. A laminated ceramic electronic component according to claim 2, wherein said laminated ceramic electronic component is a laminated ceramic capacitor.

11. A laminated ceramic electronic component according to claim 3, wherein said laminated ceramic electronic component is a laminated ceramic capacitor.

12. A laminated ceramic electronic component according to claim 6, wherein said laminated ceramic electronic component is a laminated ceramic capacitor.

13. A laminated ceramic electronic component according to claim 4, wherein said laminated ceramic electronic component is a laminated ceramic capacitor.

14. A laminated ceramic electronic component according to claim 7, wherein said laminated ceramic electronic component is a laminated ceramic capacitor.

15. A laminated ceramic electronic component according to claim 8, wherein said laminated ceramic electronic component is a laminated ceramic capacitor.

16. A laminated ceramic electronic component according to claim 9, wherein said laminated ceramic electronic component is a laminated ceramic capacitor.

17. A laminated ceramic electronic component according to claim 1, wherein the pores have a diameter of approximately 0.1 μm to approximately 3.0 μm.

18. A laminated ceramic electronic component according to claim 1, wherein oxides of Ba, Mg, Ho, and Si are contained and segregated in the high-void-ratio part.

* * * * *